United States Patent [19]

Borduz et al.

[11] Patent Number: 4,687,596

[45] Date of Patent: Aug. 18, 1987

[54] LOW VISCOSITY, ELECTRICALLY CONDUCTIVE FERROFLUID COMPOSITION AND METHOD OF MAKING AND USING SAME

[75] Inventors: Lucian Borduz, Milford; Kuldip Raj, Merrimack, both of N.H.

[73] Assignee: Ferrofluidics Corporation, Nashua, N.H.

[21] Appl. No.: 875,985

[22] Filed: Jun. 19, 1986

Related U.S. Application Data

[63] Continuation-in-part of Ser. No. 713,757, Mar. 19, 1985, Pat. No. 4,604,229, and a continuation-in-part of Ser. No. 736,388, May 21, 1985, Pat. No. 4,604,222, and a continuation-in-part of Ser. No. 773,627, Sep. 9, 1985.

[51] Int. Cl.⁴ .............................................. H01B 1/06
[52] U.S. Cl. ................................... 252/510; 252/503; 252/504; 252/506; 252/516; 252/519; 252/62.51; 252/62.55; 252/62.56; 252/513

[58] Field of Search ............... 252/510, 502, 503, 506, 252/504, 516, 511, 512, 513, 519, 62.51, 62.53, 62.54, 62.59, 62.55, 62.56, 62.6, 62.64; 524/431, 432, 435, 440, 713, 757

[56] References Cited

U.S. PATENT DOCUMENTS

| | | | |
|---|---|---|---|
| 3,764,540 | 10/1973 | Khalafalla et al. | 252/62.55 |
| 4,430,239 | 2/1984 | Wyman | 252/62.51 |
| 4,469,624 | 9/1984 | Ueda et al. | 252/513 |
| 4,604,229 | 8/1986 | Roy et al. | 252/510 |

*Primary Examiner*—Josephine L. Barr
*Attorney, Agent, or Firm*—Richard P. Crowley

[57] ABSTRACT

A low viscosity, electrically conductive ferrofluid composition and method of making and using same, which composition comprises: a first polar liquid carrier; a second polar liquid carrier miscible in the first polar carrier and comprising a polyol, such as a tetraethylene glycol dimethyl ether; magnetic particles to impart magnetic characteristics to the ferrofluid composition; and a surfactant, particularly a cationic surfactant in an amount sufficient to stabilize and disperse the magnetic particles, the surfactant dissociated or ionized predominately by the second polar liquid carrier.

23 Claims, No Drawings

LOW VISCOSITY, ELECTRICALLY CONDUCTIVE FERROFLUID COMPOSITION AND METHOD OF MAKING AND USING SAME

REFERENCE TO PRIOR APPLICATIONS

This application is a continuation-in-part of U.S. Ser. No. 713,757, filed Mar. 19, 1985, now U.S. Pat. No. 4,604,229 issued Aug. 5, 1986; U.S. Ser. No. 736,388, filed May 21, 1985, now U.S. Pat. No. 4,604,222 issued Aug. 5, 1986; and U.S. Ser. No. 773,627, filed Sept. 9, 1985; all hereinafter incorporated by reference.

U.S. patent application Ser. No. 713,757 describes an electrically conductive ferrofluid composition, which ferrofluid composition comprises a liquid carrier having a colloidal dispersion of ferromagnetic particles in an amount sufficient to provide magnetic properties to the ferrofluid composition and carbon particles in an amount sufficient to provide electrically conductive properties to the ferrofluid composition. The ferromagnetic and carbon particles are stabilized in the ferrofluid composition by a surface active dispersing agent. The electrically conductive ferrofluid composition is usefully employed in a ferrofluid exclusion seal apparatus to provide an electrically conductive seal apparatus particularly useful for computer disk drives.

U.S. patent application Ser. No. 736,388 discloses a stable ferrofluid composition and the method of preparing and using the ferrofluid composition, such as in a ferrofluid seal apparatus. The ferrofluid composition comprises: a liquid carrier; ferromagnetic particles sufficient to provide magnetic properties to the liquid carrier; and a dispersing amount of a cationic surfactant, such as a quaternary ammonium compound soluble in the carrier, to provide a stable ferrofluid composition. The stable ferrofluid compositions have improved electrical conductivity and are useful in sealing computer disk drives.

U.S. patent application Ser. No. 773,627 describes a low viscosity, electrically conductive ferrofluid composition, which composition comprises a liquid carrier, and contains in combination an electrically conductive amount of a cationic surfactant and dispersed carbon particles, to obtain a low-electrical-resistivity ferrofluid having a low viscosity and suitable for use in a ferrofluid bearing apparatus.

BACKGROUND OF THE INVENTION

Ferrofluids or magnetic colloids are liquids with magnetic properties in which ferromagnetic materials are colloidally suspended. Such ferrofluids or magnetic liquids must show a high degree of stability (gravitational and magnetic field) in order to perform well in various commercial devices and be responsive to external magnetic fields. Generally a stable magnetic colloid or ferrofluid in a high magnetic field gradient require small ferromagnetic particles of generally less than 100 angstroms in diameter. The ferromagnetic particles are typically coated with one or several separate layers of surfactants to prevent agglomeration in any particular liquid carrier.

Ferrofluids are widely known and used, and typical ferrofluid compositions are described, for example, in U.S. Pat. No. 3,700,595, issued Oct. 24, 1972, wherein anionic surfactants, such as fatty acids, alcohols, amines or amids and other organic acids are employed as dispersing surface active agents; U.S. Pat. No. 3,764,504, issued Oct. 9, 1973, wherein aliphatic monocarboxylic acids are employed as dispersing agents; U.S. Pat. No. 4,208,294, issued June 17, 1980, wherein a water based magnetic liquid is produced by the employment of $C_{10}$ to $C_{15}$ aliphatic monocarboxylic acids as acid dispersing agents; and U.S. Pat. No. 4,430,239, issued Feb. 7, 1984, wherein a stable ferrofluid composition is provided employing a phosphoric acid ester of a long-chain alcohol as a surfactant.

Various processes have been described for preparing magnetic colloids and ferrofluids, such as described more particularly in U.S. Pat. No. 3,917,538, issued Nov. 4, 1975, which provides a process for preparing an irreversibly flocked magnetic particle through the use of different dispersing agents which includes a variety of nonionic and anionic surfactants, such as various petroleum sulfonates as the anionic surfactants and wherein the ferrofluids are prepared employing a grinding or ball mill technique; U.S. Pat. No. 4,019,994, issued Apr. 26, 1977, which employs a petroleum sulfonate with an aqueous carrier; U.S. Pat. No. 4,356,098, issued Oct. 26, 1982, which describes ferrofluid compositions composed of a silicone-oil carrier and a dispersing amount of an anionic surfactant which forms a chemical bond with the surface of the magnetic particles as a tail group compatible or soluble in the silicone-oil carrier; and U.S. Pat. No. 4,485,024, issued Nov. 27, 1984, wherein a ferrofluid is produced through controlling the pH of the aqueous suspension of the ferromagnetic particles of an organic solvent together with surface active agents, such as fatty carboxylic acids.

A properly stabilized ferrofluid composition typically undergoes practically no aging or separation, remains liquid in a magnetic field and after removing of the magnetic field shows no hysteresis. Such a stabilized ferrofluid exhibits stability by overcoming generally three principal attractive forces: van der Waals, inter-particles-magnetic and gravitational forces. The average particle needed in a ferrofluid depends on the selection of the ferromagnetic materials and typically may range from 20 to 300 angstroms, for example 20 to 200 angstroms, and for use in a very high magnetic field gradient may range up to 100 angstroms in diameter. Typically, the ferromagnetic particles must be covered by one or more layers of the selected surfactant in order to provide stability in an external magnetic field gradient. While there are many known ways to obtain small particles of the ferrites, cobalts, irons and other ferromagnetic materials, the type of surfactant and dispersing agent needed to stabilize these particular particles is an important aspect of the formation of stable ferrofluid compositions and the method of preparing such compositions.

The ferrofluid compositions have been used in a wide variety of commercial applications, such as for ferromagnetic seals, as dampening liquids in inertia dampers, as heat transfer liquids in the voice coil of loudspeakers, as bearing liquids, as ferrolubricants, for domain detection, for oil prospecting, and other applications.

Electrically conductive ferrofluid compositions are usually employed in computer disk drive applications, for example to provide a conventional sealing ring, and further for the conduction of electrical charges from the shaft so as to prevent charge build up on the disk. In the computer industry, the static charge build up at the disk in a rotating spindle needs to be grounded in addition to sealing hermetically the disk cavity for contamination-free operation. Electrically conductive ferrofluids which contain finely divided dispersed carbon paticles are quite useful; however, there is a need to restrict the amount of carbon black employed in the ferrofluid compositions to avoid gradual increases in the viscosity of the composition and absorption of the fluid into the carbon particles with time. The addition of carbon black to a typical ferrofluid composition provides for a composition which tends to be pseudoplastic in amounts greater than about 5 percent of carbon black, while low concentrations of carbon black provide for a Newtonian composition. Therefore, it is desirable to provide for stable, low viscosity, highly electrically conductive ferrofluid compositions both with or without the use of carbon black, and particularly for use in the computer seal, as well as other devices wherein a stable, low viscosity, highly electrically conductive ferrofluid composition is useful.

SUMMARY OF THE INVENTION

The present invention concerns low viscosity, stable, electrically conductive ferrofluid compositions and the method of preparing and using such compositions, such as for example as a ferrolubricant and bearing apparatus and as a ferrofluid composition in seals. In particular, the invention relates to a ferrofluid composition which includes a dissociation or ionization liquid agent for the dissociation and ionization of the surfactant employed in the ferrofluid composition to disperse the magnetic particles.

The electrically conductive, low viscosity, stable ferrofluid composition comprises: a first polar liquid carrier, typically a low viscosity, nonvolatile-type liquid carrier; an agent which is miscible or soluble in the polar liquid carrier; magnetic particles dispersed in the liquid carriers in a sufficient amount to provide for the desired magnetic properties of the ferrofluid composition; and a surfactant, such as, for example, but not limited to, a cationic surfactant which acts as a dispersing agent for the ferromagnetic particles or other particles in the ferrofluid composition and which also helps to provide for electrical conductivity properties in the composition.

Importantly, the polar agent employed in the ferrofluid composition is selected to provide for dissociation or ionization of the surfactant. Typically the agent or liquid carrier comprises an oxygen-containing compound, such as for example, a polyol compound, such as a polyol ether and more particularly a glycol ether, so as to provide for dissociation of the surfactant. Optionally but preferably, the ferrofluid composition may include dispersed carbon particles in the ferrofluid composition, typically in an amount so as not to provide for a substantial increase in ferrofluid viscosity, since the addition of the carbon particles further increases the electrical conductivity of the composition. Thus, the ferrofluid composition may also include controlled amounts of dispersed carbon particles, such as finely divided carbon black, which in combination particularly with a cationic surfactant and the polyol ether provides for a very stable, but low electrical conductivity ferrofluid. When carbon particles are employed in the ferrofluid composition, it is essential to precoat the carbon particles with any of the constituents of the ferrofluid to avoid absorption and with a surfactant in order to provide for the proper dispersion of the carbon particles in the ferrofluid.

The liquid carrier employed in the preparation of the ferrofluid composition may be any type of a liquid polar carrier and typically is a stable, nonvolatile liquid, for example but not limited to: fluorocarbons; aminoalcohol; polyphenyl ethers; polyglycols; amido-amines; esters; polyolesters; glycol esters; and various other esters, such as for example, and more particularly, a polyol ester oil liquid or a polyalphaolefin base. The polar liquid carrier, as well as the second polar liquid agent, employed may contain or have various additives, such as stabilizers, antioxidants, corrosion inhibitors, viscosity index additives, or various minor amounts of other additives to improve the selected quality or property of the ferrofluid composition.

The magnetic particles employed in the ferrofluid compositions may be those magnetic-type of particles commonly employed in preparing ferrofluid compositions and typically comprise finely divided single domain particles of ferromagnetic materials, such as, but not to be limited to: magnetite; ferrites; iron; nickel; cobalt; metal carbides or metal oxides; metal alloys; and other finely divided materials which have or can be made to have magnetic properties when dispersed in a liquid carrier. One typical and preferred ferromagnetic particle comprises magnetite particles. The ferromagnetic particles employed are finely divided and are generally less than 1000 angstroms, but more typically less than 300 angstroms, such as for example about 20 to 200 angstroms in single domain particles.

The ferromagnetic particles are dispersed and stabilized and used in combination with the employment of a dispersing agent or surfactant, typically any surfactant may be employed, such as a nonionic, cationic or anionic surfactant. However, it is desirable to employ a cationic surfactant in order to provide for increased or improved electrical conductivity. The amount and nature of the surfactant employed may vary depending on the particular liquid carriers used, the ferromagnetic particles and the size thereof, and the type and stability of the dispersion desired.

Typically, the ratio of the surfactant as a dispersing agent to the ferromagnetic particles may vary, but generally in the ferrofluid composition ranges from about 0.5:1 to 20:1 by weight, with the ferromagnetic particles generally present in the composition in an amount ranging from 5 to about 80 percent by weight of the liquid carrier. The ferrofluid compositions prepared have varying saturization and magnetization values, and typically range from 20 to 800 gauss, for example 100 to 500 gauss, and range in viscosity from about 25 cp to 5000 cp.

Particularly preferred cationic surfactants comprise: the quaternary ammonium surfactant molecules, generally with two structural parts; a polar head group comprising the quaternary ammonium which attaches to the ferromagnetic particle surface or to a layer of another surfactant; and a tail group with properties similar to the surrounding fluid matrix or the polar carrier liquids, and typically being compatible with and soluble in the organic liquid carrier. Therefore, the selection of the particular tail group of the quaternized ammonium surfactant should be matched with the particular polar liquid carrier employed, for example a hydrocarbon tail group of a quaternized ammonium compound would typically be soluble in hydrocarbon oil or polyalphaolefin nonpolar-type organic liquid carriers, while tail groups having a hydroxyl or an oxygen-containing tail, e.g. OH groups, would be soluble and compatible in glycols, polyglycols, esters, esterglycols and the like. For example, a polyalkylene oxide, such as a polypropylene oxide tail group of a quaternized ammonium cationic surfactant, is typically soluble in a polar organic liquid carrier, such as esters, polyol esters, polyglycols or glycolesters. The employment of cationic surfactants as dispersing agents permits the dispersing of ferromagnetic particles in an entirely new family of organic liquid carriers or lubricants, such as polyol esters, glycols, silahydrocarbons and various other organic liquid carriers which may be used as oils, lubricants, bearing fluids and the like. Cationic surfactants which are insoluble in water also allow the possibility of making ferrofluid compositions of magnetic colloids compatible with water or alcohols. The ferrofluids employing cationic surfactants may be used in all known applications of ferrofluids, such as in sealing, dampening, lubrication, heat transfer, domain detection, bearing fluids, and in other applications.

A wide variety of cationic surfactants may be employed as the dispersing agent of the invention where the tail portion of the surfactant molecule is soluble in or compatible with the carrier liquid, and in addition is of sufficient length in order to provide a stable ferrofluid composition, for example, typically the length of the molecular structure of the tail portion of the cationic surfactant should be more than about 20 angstroms to stabilize particles having a diameter of about 100 angstroms or more. The particularly preferred cationic surfactants of the invention comprise the quaternary ammonium cationic surfactant composed of a quaternary ammonium head group and a long tail portion, such as for example, ranging in each surfactant molecule from about 10 to 50 angstroms in overall length or having $C_6$-$C_{30}$, e.g. $C_8$-$C_{18}$, carbon atoms or length.

Some quaternary ammonium cationic surfactants useful as dispersing agents in the ferrofluid composition would comprise, but not be limited to the following representative classes, such as: quaternary imidazoline salts which contain a heterocyclic ring which contains a quaternary ammonium group and includes a long chain, such as a fatty acid substituent group; aliphatic quaternary ammonium salts where at least one of the groups and often two of the groups through the quaternary ammonium and nitrogen comprises a long chain group, such as a fatty acid group; and quaternary acylated polyamine salts which contain, for example, a long chain alkoxy group such as an ethoxy or propoxy group, which compounds are particularly useful as dispersing agents where the liquid carrier comprises an oxygen-containing liquid, such as an ester, glycol or polyol ester. The cationic surfactant should be employed in an amount sufficient to provide for a stable dispersion, and may be used alone or in combination with other surfactants, such as nonionic surfactants (but not directly with anionic surfactants), and with other various additives or used in combination.

The carbon particles employed in the ferrofluid composition, which is optional but preferred, can be derived from any carbon material; however, it has been found that the best electrical conductivity is obtained by dispersing electrically conductive carbon black particles having a particle size of about 50 to 300 angstroms and a surface area of about 100 to 3000 meters per square gram, such carbon black particles are typically produced by various processes. The carbon black derived from the furnace process is particularly useful.

The agent employed is typically a high molecular weight, high boiling point, for example of over 250° C., low evaporation, oxygen-containing liquid which dissociates the surfactant or ionizes the surfactant. The surfactant selected which is dissociated may be one or more of the surfactants used in the ferrofluid composition and is present in excess quantity and should be dissociated by the polar agent, and more particularly dissociated or ionized by hydroxyl-type groups, or alkoxy-type groups, such as ethoxy and methoxy groups. The use of a polar agent which provides for such dissociation and ionization permits the preparation of low viscosity ferrofluid compositions having electrical resistivity of less than generally about $1 \times 10^7$ and in combination with amounts of up to 5 percent of carbon particles with electrical conductivity of less than $1 \times 10^6$ ohms-centimeter. The resistivity was found to depend on temperature more dramatically with carbon present than in the absence of carbon.

The polar agent employed should have one, and preferably two or more, hydroxyls or ethoxy or methoxy groups, typically separated by hydrocarbon or other alkoxy groups and must be miscible with the first liquid polar carrier. The polar agent may comprise for instance a polyol, such as glycol, and more particularly polyethylene and polypropylene glycols. While ethylene glycol and propylene glycol may be suitable, particularly in small amounts, they are not generally preferred in that they evaporate at too low a temperature and therefore limit the life of the ferrofluid compositions. The low molecular weight glycols provide higher conductivity values for the ferrofluid compared with the higher molecular weight glycols.

More particularly preferred as the polar agent are those alkyl ether compounds of polyalkylene polyols, and more particularly the lower alkyl ethers of such compounds wherein the polyalkylene comprises an ethylene or propylene. Particularly preferred compounds for use in the invention would include the di-, tri- and tetraethylene glycol dialkyl ethers and particularly those having a boiling point about 200° C., and more particularly about 250° C. Suitable specific compounds include, but not to be limited to: the diethylene glycol dibutyl ether; the tetraethylene glycol dimethyl ether, as well as triethylene glycol dimethyl ether and a lower boiling point diethylene glycol diethyl ether, as well as various low molecular weight liquid polyethylene and polypropylene glycol compounds, such as polyethylene glycol having molecular weights ranging from about 400-800.

The ferrofluid composition may be prepared employing the usual and generally accepted techniques of ball milling and grinding, or precipitation as in the prior art, to prepare the ferrofluid compositions. The cationic surfactants may be used in conjunction with anionic and nonionic surfactants or may be used as one surfactant layer; while other surfactants, anionic, nonionic or other cationic surfactants, may be used in another layer or to complete the first layer. For example, the ferromagnetic particles may be dispersed first with an anionic surfactant, and then a separate surfactant to complete the layer or as a second layer of a cationic surfactant is employed, or vice versa, to provide stable ferrofluid compositions. The techniques for such multiple layer dispersing of magnetic particles is known in the art for anionic surfactants. Thus, the stable ferrofluid composition may comprise cationic surfactants together with other surfactants, typically a first dispersing layer of an anionic fatty acid surfactant followed by a final dispersing of the anionic surfactant magnetic particles with a cationic surfactant or other surfactant which can be dissociated.

While not wishing to be better than any particular theory or method of operation, it is suspected that the employment of a second polar liquid which dissociates predominately the excess surfactant provides for the traveling of the electric charge by the dissociated surfactant between the colloidally dispersed carbon particles where the carbon particles are employed, and which carbon particles then act as small electrodes. The dispersion of the small electrode carbon particles in the ferrofluid make the connection between the rotating member, such as the shaft, and the stationary member such as the pole piece, to provide for electrical conductivity. If the carbon particles are individually colloidally suspended the resistivity will be high, while for example where the carbon particles are less than 100 angstroms; however, carbon particles may be employed in clusters or aggregates, for example over 1000 angstroms, in which case the resistivity will be low. Thus, the carbon particles may be employed in aggregate form and it is not needed to be broken up, or may be employed in individual particle broken up aggregates.

Ferrofluid compositions of improved electrical conductivity may comprise, for example, general formulations as follows:

(1) Ferromagnetic particles such as $Fe_3O_4$, about 3–7 percent by volume, for example 5 percent;
(2) Carbon black coated particles with any of the constituents of ferrofluid to minimize absorption from the furnace process, 100 angstroms or less, about 1–6 percent by volume, for example about 2.5 percent by volume;
(3) First polar liquid carrier to make up the balance of the ferrofluid compositions;
(4) polar liquid carrier, that is the dissociation or ionization agent, from about 3–20 percent by volume, more particularly 5–12 percent;
(5) First surfactant, typically an anionic surfactant, such as oleic acid, for precoating the ferromagnetic particles in an amount of from 5–10 percent by volume, for example 5 percent;
(6) Second surfactant, preferably a cationic surfactant, such as a quaternary ammonium surfactant, and more particularly a quaternary ammonium alkoxy surfactant, from about 2–12 percent by volume, and typically 5 percent.

The invention will be described for the purposes of illustration only in connection with certain embodiments; however, it is recognized that various changes, additions, modifications, and improvements in the invention may be made to these illustrative embodiments by those persons skilled in the art and all falling within the spirit and scope of the invention.

DESCRIPTION OF THE EMBODIMENTS

Example 1

The magnetite ($Fe_3O_4$) particles were prepared using 240 grams of $FeSO_4$, 425 ml of 45 percent $FeCl_3$ and 600 ml water. The solid components were well dissolved in water at 5° to 70° C. under constant agitation.

$Fe_3O_4$ was precipitated from the above solution by the slow addition of ammonia solution 30 percent $NH_3$ to reach the pH of 12. 100 ml of soap is added under a strong agitation. The soap composition is oleic acid (or isosteric acid):ammonia (30 percent $NH_3$) solution in volume ratio of 1:1.

The suspension of magnetite particles covered with oleic acid is mixed for 30 minutes at 50°–90° C., then 350 cc of an Isoparaffinic hydrocarbon fraction (ISOPAR-G having a boiling point range of 160° to 176° C. of Exxon Chemical Co.) is added to the suspension under constant agitation.

After 60 minutes of strong agitation, all the magnetite particles, well covered with oleic acid, are disperse in hydrocarbon fraction. The mixture was settled for 120 minutes. The upper layer containing the hydrocarbon base magnetic colloid was transferred into another beaker. The hydrocarbon base magnetic colloid 300 cc was mixed with 200 cc of acetone. The magnetite was allowed to settle and the supernatant liquid was siphoned off. The operation is repeated two more times in order to eliminate the excess of oleic acid.

The acetone wet slurry was added in a beaker containing 500 cc of heptane. Under the strong agitation, the slurry was heated to 80° C. in order to remove the acetone.

The remaining fluid is 450 cc heptane based magnetic colloid having approximately 400 gauss saturation magnetization.

A total of 120 grams of a polypropoxy quaternary ammonium acetate surfactant (EMCOL CC55 of WITCO Chemical Co.) was added to the heptane base magnetic colloid at 70° C. under constant stirring. Prior to using EMCOL CC55, it was cleaned in a vacuum chamber by continuous pumping for 24 hours. By this process, residual solvents present in the surfactant were removed. The surfactant amount is sufficient to provide a stable colloid and to suspend subsequent addition of carbon particles and to provide the necessary ionization to electrical conductivity. After 30 minutes of agitation at 70° C., the adsorption of the second surfactant was considered complete. A total of 300 cc of liquid carrier of Polyolester (Mobil Ester P-42, having a pour point of −51° C., flash point 243° C. and viscosity index of 134) of Mobil Chemical Co. was added under the agitation to the heptane base magnetic colloid. The mixture was held at 100° C. until all the heptane was removed. The ferrofluid was kept in high magnetic field gradient at 80° C. for 24 hours in order to remove the large aggregates. The supernatant fluid was filtered and the final magnetic colloid was 350 gauss and 60 cp viscosity at 27° C.

Ten grams of Conductex 40–220 carbon black particles (Columbia Chemicals Company) are added to a 100 cc mixture of heptane and polyolester P-42 (30 percent P-42 in heptane) and mixed thoroughly for 60 minutes. The heptane was removed at 100° C. in 72 hours. The polyolester oil was absorbed on carbon black. The carbon black slurry was kept at 100° C. in vacuum oven (30 inch vacuum) for another 24 hours at 100° C. to thoroughly remove the heptane. The carbon particles may also be coated with a glycol the same way or with a cationic surfactant.

The magnetic colloid having 350 gauss was diluted down to 250 gauss using a mixture of Tetraglyme, a tetraethylene glycol dimethyl ether, (boiling point 275° C. of Ferro Corp.) and a polyol glycol (POLYOL P-425 of Dow Chemical Company).

The mixture consisting of 50 percent glymes (organic compounds in the family of symmetrical glycol diethers) and 45 percent Polyglycol P-425 and 5 percent of triethanolamine. This mixture acts as a strong polar solvent for the cationic surfactant CC55 in final electrically conductive ferrofluid.

Forty grams of carbon black slurry (10 grams carbon black, 30 grams P-42, obtained as above) are added to 100 cc of magnetic colloid having 250 gauss and mixed in a motor mill for about 30 minutes to assure a proper dispersion of carbon black in the magnetic colloid. The electrically conductive ferrofluid has finally about 200 gauss saturation magnetization and an electrical resistivity of about $10^6$ ohm-cm. The colloid shows a thixotropic behavior.

The electrically conducting magnetic ferrofluid thus prepared was tested and had a 250 gauss saturation magnetization and an electrical resistivity of about $10^7$ ohm-cm.

In the foregoing example, the carbon black particles optionally employed in the ferrofluid composition were precoated with a polyol ester oil. Where carbon black particles are not coated, the electrical conductivity is generally lower than that obtained in Example 1. The precoating of the carbon black particles has been found to be important in order to prevent gradual increases in viscosity in the ferrofluid composition. Thus, where carbon particles are employed, the carbon particles should be precoated with any of the constituents of ferrofluid and then introduced into the ferrofluid composition.

What is claimed is:

1. In an electrically conductive ferrofluid composition, which composition comprises:
   (a) a polar liquid carrier;
   (b) finely divided magnetic particles dispersed in the polar liquid carrier and in an amount to provide magnetic properties to the ferrofluid composition;
   (c) a surfactant to disperse and stabilize the magnetic particles in the polar liquid carrier, the improvement of which comprises:
   (i) a polar-ionizing or dissociation agent which agent is miscible with the polar liquid carrier and which agent comprises an oxygen-containing agent selected from a group consisting of an alkylene polyol, an ether of an alkylene polyol or combinations thereof, the agent present in an amount sufficient to ionize or dissociate the surfactant and to provide a ferrofluid composition having an electrical resistivity of less than about $1 \times 10^7$ ohms-centimeters.

2. The composition of claim 1 wherein surfactant comprises a cationic surfactant.

3. The composition of claim 2 wherein the cationic surfactant comprises a quaternary ammonium cationic surfactant having a long chain miscible in the liquid carrier.

4. The composition of claim 1 wherein the polar liquid carrier comprises a polyol ester or a polyalpha olefin.

5. The composition of claim 1, which composition includes an anionic surfactant as a first coating layer of surfactant on the magnetic particles and a second cationic surfactant as a second coating layer.

6. The composition of claim 5 wherein the cationic surfactant comprises a quaternary ammonium cationic surfactant.

7. The composition of claim 1 wherein the surfactant is present in a ratio by weight of surfactant to magnetic particles of from about 1:1 to 20:1.

8. The composition of claim 1 wherein the agent comprises a polyalkylene glycol polyether.

9. The composition of claim 8 wherein the agent comprises a di-, tri- or tetraethylene glycol alkyl ether.

10. The composition of claim 1 wherein surfactant is present in an amount in excess of the amount sufficient to disperse and stabilize the magnetic particles.

11. The composition of claim 1 wherein the agent is selected from the group consisting of: diethyl glycol dibutyl ether; tetraethylene glycol dimethyl ether; triethylene glycol dimethyl ether; diethylene glycol diethyl ether; diethylene glycol dimethyl ether; ethylene glycol diethyl ether; polyethylene glycol and polypropylene glycol.

12. The composition of claim 1 wherein the magnetic particles comprise ferromagnetic particles having a diameter ranging from about 20 to 200 angstroms.

13. The composition of claim 1 wherein the composition includes carbon particles dispersed in the ferrofluid composition.

14. The composition of claim 13 wherein the carbon particles are present in an amount of up to about 5 percent by weight of the ferrofluid composition.

15. The composition of claim 14 wherein the ferrofluid composition has a viscosity of less than about 200 cps at 25° C. and an electrical resistivity of less than about $1 \times 10^6$ ohms.

16. The composition of claim 13 which includes carbon particles having an average diameter of about 100 angstroms or less.

17. The composition of claim 1 wherein the surfactant comprises a first coating layer on the magnetic particles of a long chain fatty acid as a first anionic surfactant and a second coating layer of a quaternary ammonium alkoxy compound as a second surfactant.

18. The composition of claim 17 wherein the first surfactant is present in an amount of from about 5 to 10 percent by volume of the composition, and the second surfactant is present in an amount of from about 2 to 12 percent by volume.

19. The composition of claim 17 which includes from about 1 to 6 percent by volume of surfactant-coated carbon black particles.

20. The composition of claim 1 wherein the agent comprises from about 3 to 20 percent by volume of the composition.

21. The composition of claim 1 wherein the surfactant comprises a cationic surfactant selected from the group consisting of: quaternary imidazoline salts; aliphatic quaternary ammonium salts; and quaternary acylated polyamine salts.

22. In an electrically conductive ferrofluid composition, which composition comprises:
   (a) a polar liquid carrier;
   (b) finely divided ferromagnetic particles dispersed in the polar liquid carrier and in an amount to provide magnetic properties to the ferrofluid composition; and
   (c) a surfactant to disperse and stabilize the ferromagnetic particles in the polar liquid carrier, the improvement which comprises:
   (i) wherein the surfactant comprises a first coating layer of a first anionic surfactant in an amount of from about 5 to 10 percent by volume of the composition and a second coating layer of a second cationic surfactant in an amount of from about 2 to 12 percent by volume of the composition; and
   (ii) carbon particles dispersed in the composition in an amount of up to about 5 percent by weight of the composition; and
   (iii) an ionizing or dissociating agent in an amount of from about 3 to 20 percent by volume of the composition, the agent selected from the group consisting of: diethyl glycol dibutyl ether; tetraethylene glycol dimethyl ether; triethylene glycol dimethyl ether; diethylene glycol diethyl ether; diethylene glycol dimethyl ether; ethylene glycol diethyl ether; polyethylene glycol and polypropylene glycol.

23. The composition of claim 22 wherein the first anionic surfactant comprises fatty acid, and the second surfactant comprises a quaternary ammonium surfactant.

* * * * *